United States Patent
Lv et al.

(10) Patent No.: US 10,642,406 B2
(45) Date of Patent: May 5, 2020

(54) TOUCH DISPLAY PANEL, DRIVING METHOD THEREOF AND TOUCH DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Lei Lv, Beijing (CN); Fei Xu, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 304 days.

(21) Appl. No.: 15/675,894

(22) Filed: Aug. 14, 2017

(65) Prior Publication Data

US 2018/0074642 A1 Mar. 15, 2018

(30) Foreign Application Priority Data

Sep. 9, 2016 (CN) .......................... 2016 1 0815785

(51) Int. Cl.
*G06F 3/041* (2006.01)
*G09G 3/36* (2006.01)
*G06F 3/044* (2006.01)
*G09G 3/20* (2006.01)

(52) U.S. Cl.
CPC ............ *G06F 3/0416* (2013.01); *G06F 3/044* (2013.01); *G06F 3/0412* (2013.01); *G09G 3/3655* (2013.01); *G09G 3/3696* (2013.01); *G06F 3/041* (2013.01); *G06F 2203/04103* (2013.01); *G09G 3/2092* (2013.01); *G09G 2354/00* (2013.01)

(58) Field of Classification Search
CPC ...... G06F 3/0416; G06F 3/0412; G06F 3/044; G09G 3/20
See application file for complete search history.

(56) References Cited

U.S. PATENT DOCUMENTS

| | | | |
|---|---|---|---|
| 2012/0182282 A1* | 7/2012 | van Veenendaal | G09G 3/344 345/212 |
| 2013/0057481 A1* | 3/2013 | Lee | G06F 3/0412 345/173 |
| 2016/0291711 A1* | 10/2016 | Jin | G06F 3/044 |

* cited by examiner

*Primary Examiner* — Temesghen Ghebretinsae
*Assistant Examiner* — Paras D Karki
(74) *Attorney, Agent, or Firm* — Calfee, Halter & Griswold LLP (57) ABSTRACT

A touch display panel, a driving method thereof and a touch display device are disclosed. The touch display panel includes a base substrate, a plurality of touch electrode blocks in an array disposed on the base substrate, and touch wires, and further includes a switching transistor, a storage capacitor, a first control chip and a second control chip. The switching transistor has a gate electrode connected to the first control chip, a source electrode connected to an end of the storage capacitor and a drain electrode connected to the touch electrode block; the first control chip is configured to output a first control signal to control the switching transistor to be turned off, and output a second control signal to control the switching transistor to be turned on; and the second control chip is configured to output a charging signal to charge the storage capacitor.

19 Claims, 4 Drawing Sheets

TOUCH DISPLAY PANEL, DRIVING METHOD THEREOF AND TOUCH DISPLAY DEVICE

CROSS-REFERENCE TO RELATED APPLICATIONS

The present application claims priority to Chinese Patent Application No. 201610815785.7, filed Sep. 9, 2016, and the entire contents of which are incorporated herein by reference.

TECHNICAL FIELD

The present disclosure relates to the field of display technology, and more particularly to a touch display panel, a driving method thereof, and a touch display device.

BACKGROUND

With touch technology increasingly enters people's daily lives, a touch screen is becoming more and more popular. Touch screen may be divided into external touch screens, on-cell touch screen, and in-cell touch screen. The external touch screen may position a panel with touch function in front of a display, and the touch surface covers a visible area of a display region, to implement touch control. The on-cell touch screen generally has a touch sensor outside a liquid crystal display screen, and a polarizer, a protection glass or the like are attached. The in-cell touch screen generally has a sensor at the side of an array substrate, or has the sensor at the side of the array substrate and at the side of the color film substrate to form the liquid crystal display panel and implement touch function. Since the in-cell product is thinner, this product will become the trend of the development in future.

In the related art, an in cell-type of touch display panel includes a base substrate, touch electrode blocks arranged in an array disposed on the base substrate, a plurality of touch wires and a touch control chip. Each touch electrode block is electrically connected to the touch control chip through one touch wire. An insulation layer is disposed between the touch electrode blocks and the touch wires. The touch wires are electronically connected to the touch electrode blocks through via holes penetrating the insulation layer. The touch electrode blocks are used with a common electrode. During a display stage, the touch electrode blocks are required to be resumed to a common voltage.

When the touch display panel switches into the display stage after the touch detection is completed in the H-Blank Sensor mode, since a driving power of an Integrated Circuit (IC) is not enough, the recovery of the common voltage (Vcom) is very slow, affecting a proper display when the touch display panel switches into the display stage.

The H-Blank Sensor mode refers to that a display phase and a touch detection phase are arranged alternatively during a time period for displaying one frame. The touch phase between two adjacent display phases is defined as a touch period. A time point of switching from a display phase to a touch phase is defined as a time point of switching to the touch phase. A time point of switching from a touch detection phase to a display phase is defined as a time point of switching to the display phase. Therefore, the term "before switching to the touch phase" refers to a time period of the touch display panel in a display phase, the term "after switching to the touch phase" refers to a time period of the touch display panel in a touch detection phase, and the term "after switching to the display phase" refers to a time period of the touch display panel in the display phase.

In the related art, when the touch detection is completed in the H-Blank Sensor mode and the touch display panel switches to the display phase, the recovery of the touch electrode blocks to have the common voltage is implemented only by supplying power through the touch wires. Since the IC has not enough driving power, the recovery process of the touch electrode blocks to have the common voltage is slow, and the recovery time period is long, affecting the proper display of the touch display panel when it switches into the display stage.

SUMMARY

The present disclosure provides a touch display panel, a driving method thereof and a touch display device.

An embodiment of the present disclosure provides a touch display panel, including a base substrate, a plurality of touch electrode blocks in an array disposed on the base substrate, a plurality of touch wires and a touch control chip, each of the touch electrode blocks being electrically connected to the touch control chip through one of touch wires, and the touch display panel further including at least one switching transistor, a storage capacitor, a first control chip and a second control chip, wherein the switching transistor has a gate electrode connected to the first control chip, a source electrode connected to an end of the storage capacitor and a drain electrode connected to the touch electrode block;

the other end of the storage capacitor is connected to the second control chip;

the first control chip is configured to, before switching to a touch detection period, output a first control signal to control the switching transistor to be turned off, and when switching to a display period, output a second control signal to control the switching transistor to be turned on; and the second control chip is configured to, before switching to the touch detection period, output a charging signal to charge the storage capacitor, such that the storage capacitor has a preset voltage.

An embodiment of the present disclosure also provides a touch display device, including the above-described touch display panel.

An embodiment of the present disclosure also provides a driving method for the above-described touch display panel, the method including:

before switching to a touch detection period, outputting a charging signal, by the second control chip, to charge the storage capacitor, such that the storage capacitor has the preset voltage, and outputting a first control signal, by the first control chip, to control the switching transistor to be turned off;

after switching to a touch detection period, transmitting a touch scan signal, by the touch wire, to the touch electrode block, and transmitting a touch signal generated by a touch electrode block at a position where a touch occurs, by the touch wire, to the touch control chip; and when switching to a display period, outputting a second control signal, by the first control chip, to control the switching transistor to be turned on.

DETAILED DESCRIPTION

Embodiments of the present disclosure provide a touch display panel, a driving method thereof and a touch display device, to solve the problem in the related art that during the display phase, the process of make the touch electrode blocks to be recovered to have the common voltage is slow.

In order to make the objective, the technical solution and advantages of the present disclosure clearer, the present disclosure will be described clearly and thoroughly in conjunction with the accompanying drawings. Apparently, the described embodiments are merely part of the embodiments of the present disclosure and are not intended to be all of the embodiments. Based on embodiments in the present disclosure, all other embodiments obtained by those of ordinary skill in the art without making creative work fall within the protective scope of the present disclosure.

Below, the touch display panel provided by specific embodiments of the present disclosure will be described in detail in conjunction with the accompanying drawings.

Figure 1:
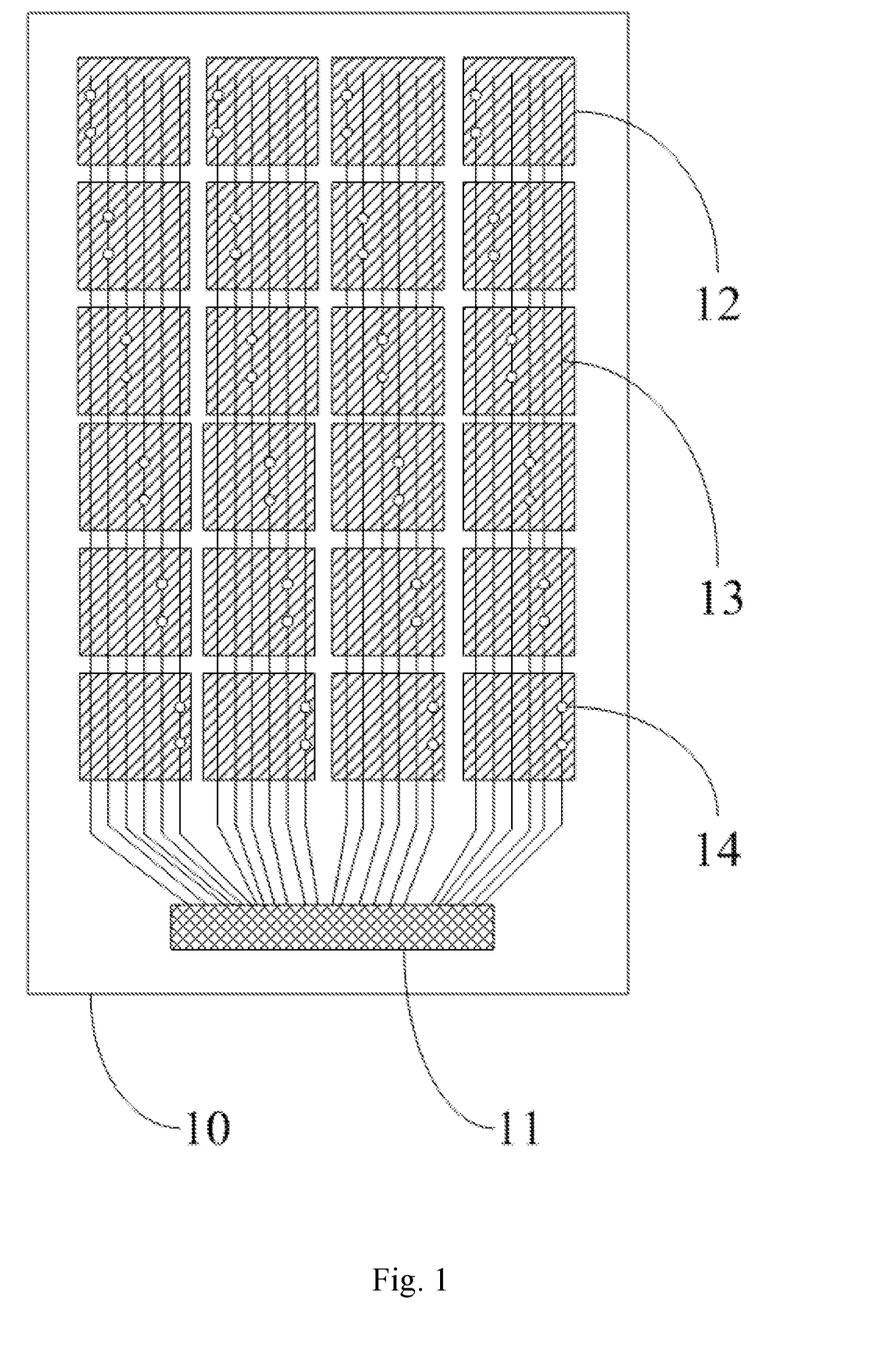
FIG. 1 is a structural schematic diagram of a touch display panel in the related art.

As shown in FIG. 1, in the related art, an in cell-type of touch display panel includes a base substrate 10, a plurality of touch electrode blocks 12 arranged in an array disposed on the base substrate 10, a plurality of touch wires 13 and a touch control chip 11. Each touch electrode block 12 is electrically connected to the touch control chip 11 through one touch wire 13. An insulation layer (not shown) is disposed between the touch electrode blocks 12 and the touch wires 13. The touch wires 13 are electronically connected to the touch electrode blocks 12 through via holes 14 penetrating the insulation layer. The touch electrode blocks 12 are used with a common electrode. During a display stage, the touch electrode blocks 12 are required to be resumed to a common voltage.

When the touch display panel as shown in FIG. 1 switches into the display stage after the touch detection is completed in the H-Blank Sensor mode, since a driving power of an Integrated Circuit (IC) is not enough, the recovery of the common voltage (Vcom) is very slow, affecting a proper display when the touch display panel switches into the display stage.

Figure 2:
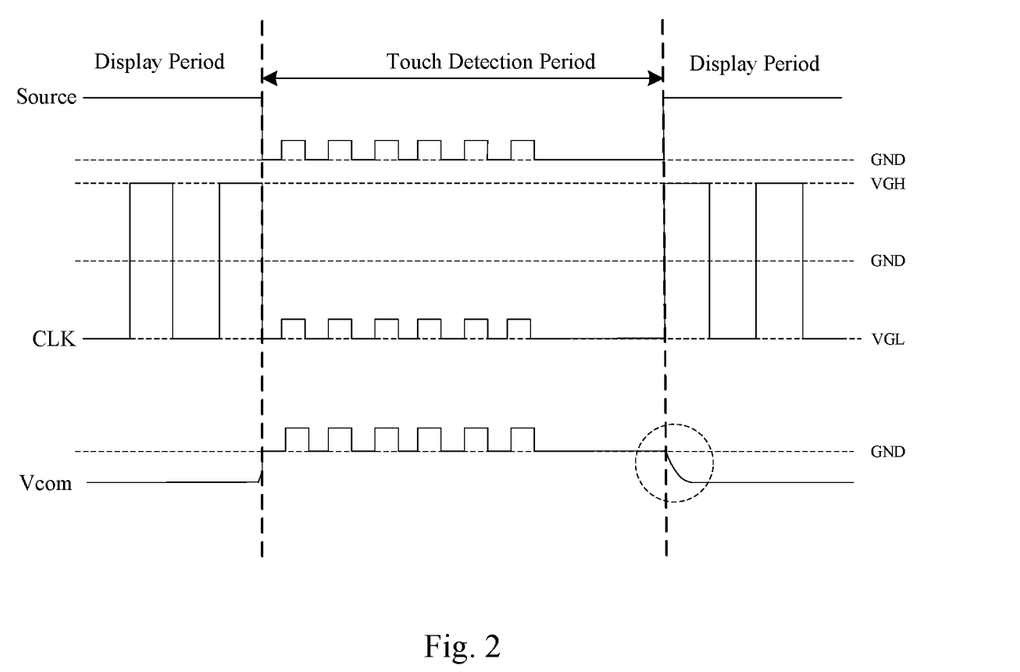
FIG. 2 is a schematic diagram of a driving timing of a touch display panel in the related art.

As shown in FIG. 2, the H-Blank Sensor mode refers to that a display phase and a touch detection phase are arranged alternatively during a time period for displaying one frame. The touch phase between two adjacent display phases is defined as a touch period. A time point of switching from a display phase (or period) to a touch phase is defined as a time point of switching to the touch phase. A time point of switching from a touch detection phase to a display phase is defined as a time point of switching to the display phase. Therefore, the term "before switching to the touch phase" refers to a time period of the touch display panel in a display phase, the term "after switching to the touch phase" refers to a time period of the touch display panel in a touch detection phase, and the term "after switching to the display phase" refers to a time period of the touch display panel in the display phase. FIG. 2 shows a diagram of a driving timing of source signals, CLK signals and Vcom signals in operation of the touch display panel.

As shown in FIGS. 1 and 2, in the related art, when the touch detection is completed in the H-Blank Sensor mode and the touch display panel switches to the display phase, the recovery of the touch electrode blocks 12 to have the common voltage is implemented only by supplying power through the touch wires 13. Since the IC has not enough driving power, the recovery process of the touch electrode blocks 12 to have the common voltage is slow, and the recovery time period is long, affecting the proper display of the touch display panel when it switches into the display stage.

The sizes and shapes of the films, layers and regions in the drawings do not reflect the actual proportion between the films, layers and regions, and are only for the purpose of illustration of the present disclosure.

Figure 3:
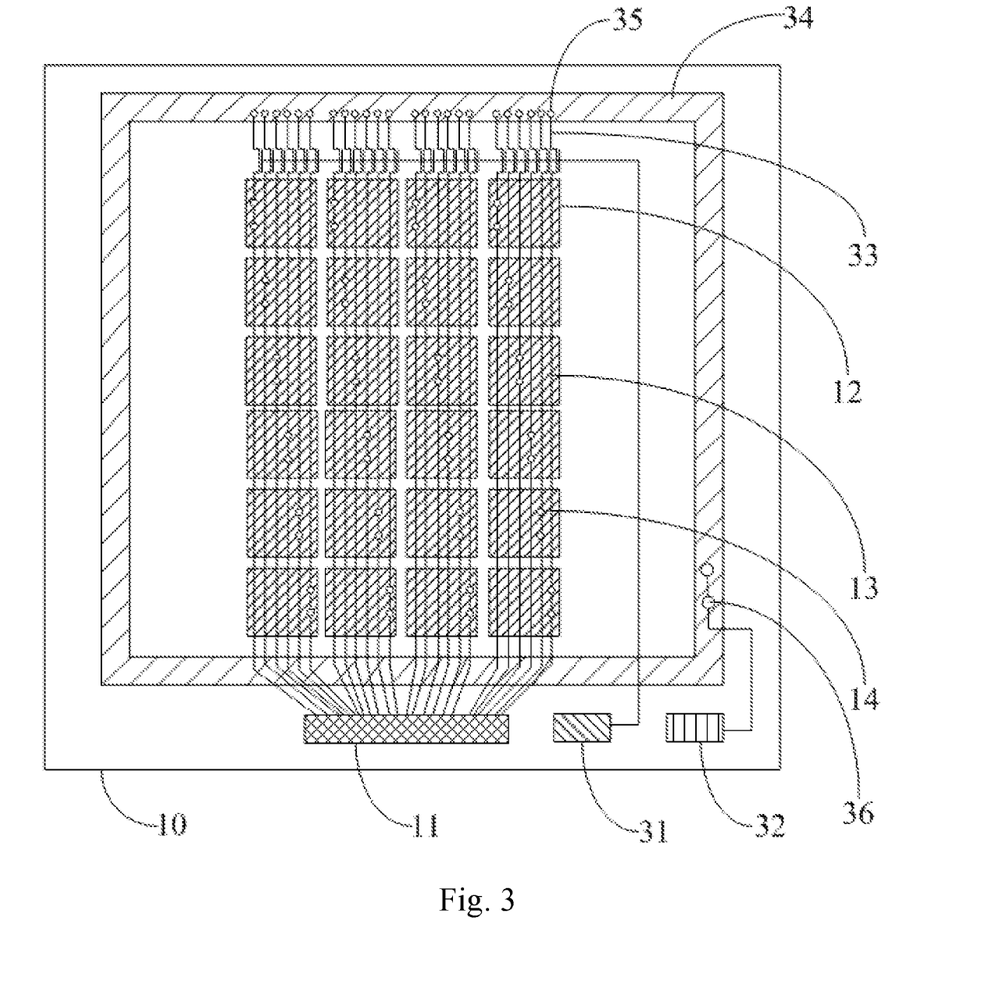
FIG. 3 is a structural schematic diagram of a touch display panel provided by an embodiment of the present disclosure.

As shown in FIG. 3, a specific embodiment of the present disclosure provides a touch display panel, including a base substrate 10, a plurality of touch electrode blocks 12 in an array disposed on the base substrate 10, a plurality of touch wires 13 and a touch control chip 11. Each of the touch electrode blocks 12 is electrically connected to the touch control chip 11 through one of the touch wires 13. In a specific embodiment of the present disclosure, the touch display panel also includes: at least one switching transistor 33, a storage capacitor 34, a first control chip 31 and a second control chip 32.

The switching transistor 33 has a gate electrode connected to the first control chip 31, a source electrode connected to an end of the storage capacitor 34 and a drain electrode connected to the touch electrode block 12.

The other end of the storage capacitor 34 is connected to the second control chip 32.

The first control chip 31 is configured to, before switching to a touch detection period, output a first control signal to control the switching transistors to be turned off, and when switching to a display period, output a second control signal to control the switching transistors to be turned on.

The second control chip 32 is configured to, before switching to the touch detection period, output a charging signal to charge the storage capacitor 34, such that the storage capacitor 34 has a preset voltage.

In a specific embodiment of the present disclosure, the switching transistor 33 has the gate electrode connected to the first control chip 31, the source electrode connected to the end of the storage capacitor 34 and the drain electrode connected to the touch electrode block 12. When switching to the display period, the first control chip 31 controls the switching transistors 33 to be turned on. At this time, the touch electrode blocks 12 are conducted with the storage capacitor 34. Before switching to the touch detection period, the storage capacitor 34 is charged to have the preset voltage and the switching transistors 33 are turned off. Therefore, when switching to the display period, there is a voltage difference between the touch electrode blocks 12 and the storage capacitor 34, and the storage capacitor 34 will quickly charge all of the touch electrode blocks 12 through the switching transistors 33. Compared with the related art in which the touch electrode blocks 12 may only be charged through the touch wires 13 when switching to the display period, in the specific embodiment of the present disclosure, when switching to the display period, the touch electrode blocks 12 are charged not only through the touch wires 13, but also charged by the storage capacitor 34. Thus, charging the touch electrode blocks 12 may be quickly completed, reducing the time for charging the touch electrode blocks 12 when switching to the display period, and reducing the time for resuming the touch electrode blocks 12 to have the common voltage. Therefore, it may effectively solve the problem that during the display phase, the process of resuming the touch electrode blocks 12 to have the common voltage is slow.

Particularly, in a specific embodiment of the present disclosure, an insulation layer (not shown in FIG. 3) is disposed between the switching transistor 33 and the storage capacitor 34. The source electrode of the switching transistor 33 is connected to the storage capacitor 34 through a via hole 35 penetrating the insulation layer. In addition, in a specific embodiment of the present disclosure, the second control chip 32 is electrically connected to the storage capacitor 34 through a via hole 36. In a specific embodiment of the present disclosure, the touch electrode blocks 12 and the touch wires 13 are disposed similarly to those in the related art, which will not be repeated herein.

As shown in FIG. 3, in a specific embodiment of the present disclosure, the number of the switching transistors 33 is the same as that of the touch electrode blocks 12. Each switching transistor 33 has a gate electrode connected to the first control chip 31, a source electrode connected to the storage capacitor 34 and a drain electrode connected to a corresponding one of the touch electrode blocks 12. In a specific implementation, the source electrode and the drain electrode of the switching transistor 33 may be interchangeable in terms of function depending on different input signals, which will not be differentiated herein.

In a specific embodiment of the present disclosure, the switching transistor 33 is an N-type thin film transistor. However, during a practical production process, the switching transistor 33 may be a P-type thin film transistor. In a specific embodiment of the present disclosure, as an example, the switching transistor 33 is an N-type thin film transistor.

In a specific embodiment of the present disclosure, the storage capacitor 34 is disposed at a peripheral region of the base substrate 10. In specific implementation, if the base substrate 10 is a base substrate for preparing an array substrate, the storage capacitor 34 may be disposed on the base substrate 10 at a position corresponding to an adhesive for sealing, which does not influence the touch performance and display effect. In a specific implementation, an upper electrode plate and a lower electrode plate of the storage capacitor 34 in the specific embodiment of the present disclosure may be made by using a separate mask, or may be made at the same layer as the conductive film layer on the array substrate. For example, in the specific embodiment of the present disclosure, the upper electrode plate of the storage capacitor 34 is made at the same layer as a common electrode layer included in the array substrate, and the lower electrode plate is made at the same layer as a gate layer included in the array substrate.

In a specific embodiment of the present disclosure, the storage capacitor 34 has a pattern of a hollow rectangular shape. The storage capacitor 34 of a hollow rectangular shape may be easily designed and may store more charges. However, in the practical production process, the pattern shape of the storage capacitor 34 may be designed to be other symmetric or asymmetric, regular or irregular shapes. The specific embodiment of the present disclosure does not limit the pattern shape of the storage capacitor 34.

Below, the operation of the touch display panel provided by the specific embodiment of the present disclosure will be described in detail in conjunction with FIGS. 3 and 4.

Figure 4:
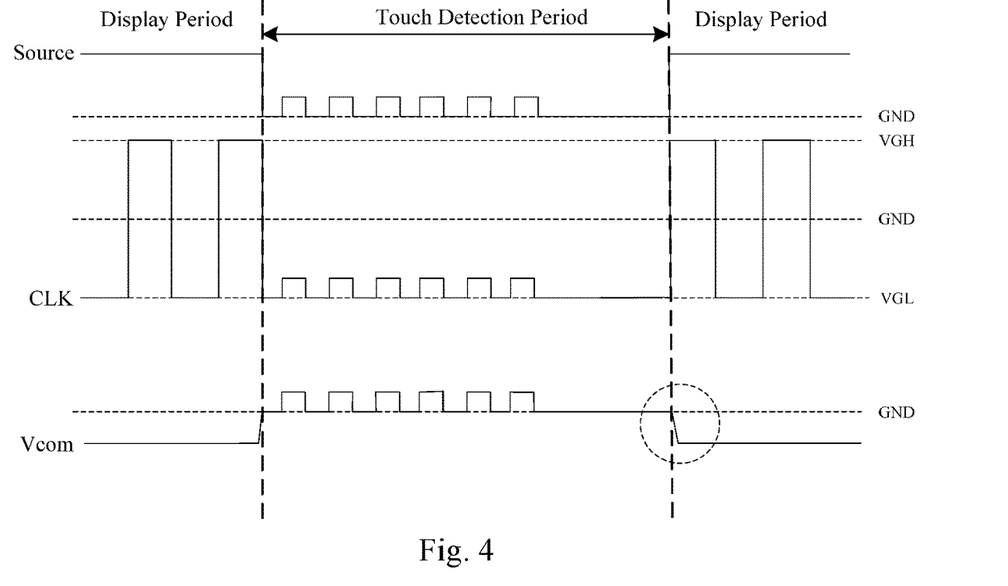
FIG. 4 is a schematic diagram of a driving timing of a touch display panel provided by an embodiment of the present disclosure.

As shown in FIGS. 3 and 4, firstly, before switching to a touch detection period, the second control chip 32 outputs a charging signal to charge the storage capacitor 34, such that the storage capacitor 34 has a preset voltage. In the specific embodiment of the present disclosure, the preset voltage is a voltage value which is previously set. The voltage value may be equal to the voltage value of the common voltage. The first control chip 31 outputs a first control signal to control all of the switching transistors 33 to be turned off. In the specific embodiment of the present disclosure, the first control signal is a voltage control signal of a low level voltage (VGL). At this time, the touch electrode blocks 12 remains at the common voltage. In the specific embodiment of the present disclosure, the term "before switching to a (the) touch detection period" refers to a display phase before the time of about to come into the touch detection period, and the term "after switching to a (the) display period" refers to a display phase after the time of just coming out of the touch detection period.

Subsequently, after switching to the touch detection period, the control chip 11 resumes the potential of the touch electrode blocks 12 to the ground voltage (GND) through the touch wires 13, and performs detection by sending a square wave signal for the touch detection through the touch wires 13. After the detection is completed, the potential of the touch electrode blocks 12 is resumed to the ground voltage (GND) through the touch wires 13. In the specific embodiment of the present disclosure, the touch detecting process after switching to the touch detection period is the same as that in the related art, which will not be repeated herein.

Subsequently, when switching to the display period, the touch control chip 11 charges the touch electrode blocks 12 by outputting a common voltage through the touch wires 13. At the same time, the first control chip 31 outputs a second control signal to control all of the switching transistors 33 to be turned on. In the specific embodiment of the present disclosure, the second control signal is a control signal of a high level voltage (VGH). At this time, the touch electrode blocks 12 are conducted with the storage capacitor 34. Since before switching to the touch detection period, the storage capacitor 34 is charged to have the preset voltage, at this time, there is a voltage difference between the touch electrode blocks 12 and the storage capacitor 34, the storage capacitor 34 will quickly charge all of the touch electrode blocks 12 through the switching transistors 33. After the charge is completed, the touch electrode blocks 12 will remains at the common voltage before the next time point of coming into the touch detection period. In the specific embodiment of the present disclosure, the process of charging the touch electrode blocks 12 by outputting a common voltage through the touch wires 13 is the same as that in the related art, which will not be repeated herein.

Therefore, in the specific embodiment of the present disclosure, when switching to the display period, the touch electrode blocks 12 are charged not only through the touch wires 13, but also charged by the storage capacitor 34. Compared with the related art in which the touch electrode blocks 12 may only be charged through the touch wires 13, in the specific embodiment of the present disclosure, the touch electrode blocks 12 may be quickly charged to have the common voltage, reducing the time for charging the touch electrode blocks 12, and reducing the time for resuming the touch electrode blocks 12 to have the common voltage. The specific comparison result is shown in FIGS. 2 and 4.

In the specific embodiment of the present disclosure, after switching to the display period, when the voltage of the touch electrode blocks 12 is equal to the voltage of the storage capacitor 34, that is, when there is no voltage difference between the touch electrode blocks 12 and the storage capacitor 34, the storage capacitor 34 cannot charge the touch electrode blocks 12 any longer. At this time, in the specific embodiment of the present disclosure, when the first control chip 31 detects that the voltage of the touch electrode blocks 12 is equal to the voltage of the storage capacitor 34, the first control chip 31 outputs a first control signal to control all of the switching transistors 33 to be turned off. In the specific embodiment of the present disclosure, when the second control chip 32 detects that the voltage of the touch electrode blocks 12 is equal to the voltage of the storage capacitor 34, the second control chip 32 outputs a turn-off signal to stop charging the storage capacitor 34. At this time, in the specific embodiment of the present disclosure, the touch control chip 11 will quickly charge the touch electrode blocks 12 to have the common voltage through the touch wires 13.

In the specific embodiment of the present disclosure, when the voltage of the touch electrode blocks 12 is equal to the voltage of the storage capacitor 34, the storage capacitor 34 and the touch electrode blocks 12 are disconnected. It not only may reduce the driving load of the touch control chip 11, but also may further reduce the charging time period of the touch electrode blocks 12. In addition, by stopping the charging of the storage capacitor 34, it may reduce the driving load of the chips of the entire touch display panel.

In the practical production process, in the specific embodiment of the present disclosure, in order to further reduce the drive load of the chip of the entire touch display panel, after the charging of the touch electrode blocks 12 is completed, the storage capacitor 34 is charged, to supplement the lost electrical charge. Specifically, after switching to the display period, in the specific embodiment of the present disclosure, when the second control chip 32 detects that the voltage of the touch electrode blocks 12 is the common voltage, the second control chip 32 outputs a charging signal to charge the storage capacitor 34, such that the storage capacitor 34 has the preset voltage.

In a specific implementation, in the specific embodiment of the present disclosure, the absolute value of the preset voltage is larger than or equal to the absolute value of the common voltage. When in the specific embodiment of the present disclosure, the absolute value of the preset voltage is larger than the absolute value of the common voltage, it may further reduce the charging time period of the touch electrode blocks 12. The specific value of the preset voltage may be set according to the practical production. For example, when the absolute value of the preset voltage is relatively large, it may cause over-charging of the touch electrode blocks 12. Then, discharge is required to be performed by the touch control chip 11, to ensure that the touch electrode blocks 12 have the common voltage.

In a specific embodiment of the present disclosure, there is also provided a touch display device, including above touch display panel provided by the specific embodiment of the present disclosure. The touch display device may be a liquid crystal panel, a liquid crystal display, a liquid crystal television, an organic light emitting diode (OLED) panel, an OLED display, an OLED television, an electronic paper or other display devices.

Figure 5:
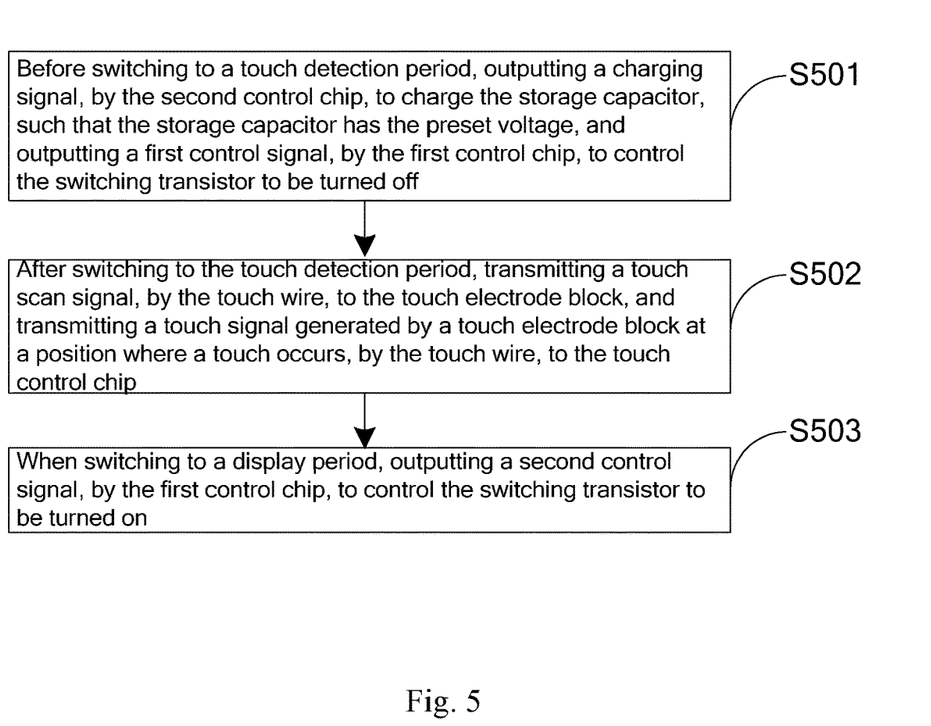
FIG. 5 is a flow chart of a driving method for a touch display panel provided by an embodiment of the present disclosure.

As shown in FIG. 5, a specific embodiment of the present disclosure also provides a driving method for the above touch display panel. The method includes the following steps.

At step S501, before switching to a touch detection period, the second control chip outputs a charging signal to charge the storage capacitor, such that the storage capacitor has a preset voltage, and the first control chip outputs a first control signal to control the switching transistors to be turned off.

At step S502, after switching to the touch detection period, the touch wires transmit a touch scan signal to the touch electrode blocks, and transmit to the touch control chip a touch signal generated by a touch electrode block at a position where a touch occurs.

At step S503, when switching to a display period, the first control chip outputs a second control signal to control the switching transistors to be turned on.

In a specific embodiment of the present disclosure, the driving method for the touch display panel further includes: after switching to the display period, when the voltage of the touch electrode blocks is equal to the voltage of the storage capacitor, the first control chip outputs a first control signal to control the switching transistors to be turned off, and the second control chip outputs a turn-off signal to stop charging the storage capacitor. At this time, in a specific embodiment of the present disclosure, the touch control chip 11 will quickly charge the touch electrode blocks 12 to have the common voltage through the touch wires 13. It not only may reduce the driving load of the touch control chip 11, but also may further reduce the charging time period of the touch electrode blocks 12. In addition, by stopping the charging of the storage capacitor 34, it may reduce the driving load of the chips of the entire touch display panel.

Further, in order to reduce the driving load of the chip of the entire touch display panel, in a specific embodiment of the present disclosure, the driving method for the touch display panel further includes: after switching to the display period, when the voltage of the touch electrode blocks is the common voltage, the second control chip outputs a charging signal to charge the storage capacitor, such that the voltage of the storage capacitor is the preset voltage. Thus, it may supplement the lost charge of the storage capacitor, which may fully prepare for charging the touch electrode blocks at the next time.

In addition, in a specific embodiment of the present disclosure, at step S502, after switching to the touch detection period, the touch detection phase of the touch control chip and the specific driving method are the same as those in the related art, which will not be repeated herein.

In summary, in a specific embodiment of the present disclosure, there is provided a touch display panel, including: a base substrate, a plurality of touch electrode blocks in an array disposed on the base substrate, a plurality of touch wires and a touch control chip, each of the touch electrode blocks being electrically connected to the touch control chip through one of the touch wires, and the touch display panel further including at least one switching transistor, a storage capacitor, a first control chip and a second control chip; wherein the switching transistor has a gate electrode connected to the first control chip, a source electrode connected to an end of the storage capacitor and a drain electrode connected to the touch electrode block; the other end of the storage capacitor is connected to the second control chip; the first control chip is configured to, before switching to a touch detection period, output a first control signal to control the switching transistor to be turned off, and when switching to a display period, output a second control signal to control the switching transistor to be turned on; and the second control chip is configured to, before switching to the touch detection period, output a charging signal to charge the storage capacitor, such that the storage capacitor has a preset voltage. In the specific embodiments of the present disclosure, the switching transistor has a gate electrode connected to the first control chip, a source electrode connected to the storage capacitor and a drain electrode connected to the touch electrode block. When switching to a display period, the first control chip controls the switching transistor to be turned on, and the touch electrode blocks are conducted with the storage capacitor. Since before the time of coming into the touch detection period, the storage capacitor is charged to have the preset voltage, there is a voltage difference between the touch electrode blocks, and the storage capacitor will quickly charge all of the touch electrode blocks through the switching transistors. Compared with the related art in which the touch electrode blocks may only be charged through the touch wires when switching to the display period, in a specific embodiment of the present disclosure, when switching to the display period, the touch electrode blocks are charged not only through the touch wires, but also charged by the storage capacitor. Thus, charging the touch electrode blocks may be quickly completed, thereby reducing the time for charging the touch electrode blocks, and reducing the time for resuming the touch electrode blocks to have the common voltage.

It will be apparent to those skilled in the art that various modifications and variations can be made in the present disclosure without departing from the spirit and scope of the present disclosure. In this way, the present disclosure is intended to embrace such modifications and variations if the modifications and variations of the present disclosure are within the scope of the appended claims and the equivalents thereof.

What is claimed is:

1. A touch display panel, comprising a base substrate, a plurality of touch electrode blocks in an array disposed on the base substrate, a plurality of touch wires and a touch control chip, each of the touch electrode blocks being electrically connected to the touch control chip through one of the touch wires, and the touch display panel further comprising at least one switching transistor, a storage capacitor, a first control chip and a second control chip, wherein the switching transistor has a gate electrode being connected to the first control chip and being controllable by the first control chip, a source electrode of the switching transistor connected to an electrode plate of the storage capacitor through a via hole and a drain electrode of the switching transistor connected to the touch electrode block, and the touch electrode block is connected to the storage capacitor via the source electrode and the drain electrode of the switching transistor and is chargeable by the storage capacitor;

the electrode plate of the storage capacitor is connected to the second control chip through a via hole;

the second control chip is configured to, before switching to a touch detection period, output a charging signal to charge the storage capacitor, such that the storage capacitor has a preset voltage; and the first control chip is configured to, before switching to the touch detection period, output a first control signal to the gate electrode of the switching transistor to control the switching transistor to be turned off, and when switching to a display period, output a second control signal to the gate electrode of the switching transistor to control the switching transistor to be turned on so that the touch electrode block is conducted with the storage capacitor and is charged by the storage capacitor having the preset voltage.

2. The touch display panel of claim 1, wherein after switching to the display period, the first control chip is further configured to, when it is detected that a voltage of the touch electrode block is equal to the voltage of the storage capacitor, output a first control signal to control the switching transistor to be turned off; and the second control chip is further configured to, when it is detected that the voltage of the touch electrode block is equal to the voltage of the storage capacitor, output a turn-off signal to stop charging the storage capacitor.

3. The touch display panel of claim 2, wherein after switching to the display period, the second control chip is further configured to, when it is detected that the voltage of the touch electrode block is a common voltage, output a charging signal to charge the storage capacitor, such that the storage capacitor has the preset voltage.

4. The touch display panel of claim 3, wherein an absolute value of the preset voltage is larger than or equal to an absolute value of the common voltage.

5. The touch display panel of claim 1, wherein the storage capacitor is disposed at a peripheral region of the base substrate.

6. The touch display panel of claim 5, wherein the storage capacitor has a pattern of a hollow rectangular shape.

7. The touch display panel of claim 1, wherein the number of the at least one switching transistor is the same as that of the touch electrode blocks, each of the at least one switching transistor has a gate electrode connected to the first control chip, a source electrode connected to the storage capacitor and a drain electrode connected to a corresponding one of the touch electrode blocks.

8. The touch display panel of claim 7, wherein the switching transistor is an N-type thin film transistor.

9. A touch display device, comprising the touch display panel of claim 1.

10. The touch display panel of claim 9, wherein after switching to the display period, the first control chip is further configured to, when it is detected that a voltage of the touch electrode block is equal to the voltage of the storage capacitor, output a first control signal to control the switching transistor to be turned off; and the second control chip is further configured to, when it is detected that the voltage of the touch electrode block is equal to the voltage of the storage capacitor, output a turn-off signal to stop charging the storage capacitor.

11. The touch display panel of claim 10, wherein after switching to the display period, the second control chip is further configured to, when it is detected that the voltage of the touch electrode block is a common voltage, output a charging signal to charge the storage capacitor, such that the storage capacitor has the preset voltage.

12. The touch display panel of claim 11, wherein an absolute value of the preset voltage is larger than or equal to an absolute value of the common voltage.

13. The touch display panel of claim 9, wherein the storage capacitor is disposed at a peripheral region of the base substrate.

14. The touch display panel of claim 13, wherein the storage capacitor has a pattern of a hollow rectangular shape.

15. The touch display panel of claim 9, wherein the number of the at least one switching transistor is the same as that of the touch electrode blocks, each of the at least one switching transistor has a gate electrode connected to the first control chip, a source electrode connected to the storage capacitor and a drain electrode connected to a corresponding one of the touch electrode blocks.

16. The touch display panel of claim 15, wherein the switching transistor is an N-type thin film transistor.

17. A driving method for a touch display panel, the touch display panel comprising a base substrate, a plurality of touch electrode blocks in an array disposed on the base substrate, a plurality of touch wires and a touch control chip, each of the touch electrode blocks being electrically connected to the touch control chip through one of the touch wires, and the touch display panel further comprising at least one switching transistor, a storage capacitor, a first control chip and a second control chip, wherein the switching transistor has a gate electrode being connected to the first control chip and being controllable by the first control chip, a source electrode of the switching transistor connected to an electrode plate end of the storage capacitor, a drain electrode of the switching transistor connected to the touch electrode block and the touch electrode block is connected to the storage capacitor via the source electrode and the drain electrode of the switching transistor and is chargeable by the storage capacitor; the electrode plate of the storage capacitor is connected to the second control chip through a via hole; the second control chip is configured to, before switching to the touch detection period, output a charging signal to charge the storage capacitor, such that the storage capacitor has a preset voltage; and the first control chip is configured to, before switching to a touch detection period, output a first control signal to the gate electrode of the switching transistor to control the switching transistor to be turned off, and when switching to a display period, output a second control signal to the gate electrode of the switching transistor to control the switching transistor to be turned on so that the touch electrode block is conducted with the storage capacitor and is charged by the storage capacitor having the preset voltage; the method comprising:

before switching to a touch detection period, outputting a charging signal, by the second control chip, to charge the storage capacitor, such that the storage capacitor has the preset voltage, and outputting a first control signal, by the first control chip, to control the switching transistor to be turned off;

after switching to the touch detection period, transmitting a touch scan signal, by the touch wire, to the touch electrode block, and transmitting a touch signal generated by a touch electrode block at a position where a touch occurs, by the touch wire, to the touch control chip; and when switching to a display period, outputting a second control signal, by the first control chip, to control the switching transistor to be turned on.

18. The driving method of claim 17, further comprising:
after switching to the display period, when the voltage of the touch electrode block is equal to the voltage of the storage capacitor, outputting the first control signal, by the first control chip, to control the switching transistor to be turned off, and outputting a turn-off signal, by the second control chip, to stop charging the storage capacitor.

19. The driving method of claim 18, further comprising:
after switching to the display period, when the voltage of the touch electrode block is the common voltage, outputting a charging signal, by the second control chip, to charge the storage capacitor, such that the storage capacitor has the preset voltage.

* * * * *